UNITED STATES PATENT OFFICE.

JOHN G. BORDEN, OF SOUTH EAST, NEW YORK.

IMPROVEMENT IN CONDENSING MILK.

Specification forming part of Letters Patent No. 132,621, dated October 29, 1872.

*To all whom it may concern:*

Be it known that I, JOHN G. BORDEN, of South East, in the county of Putnam, in the State of New York, have invented a new and Improved Mode of Preparing Milk for Condensation; and I do hereby declare that the following is a full and exact description thereof.

My invention consists in the admitting or injecting of steam of any desired temperature directly into the milk, and to continue said operation until the milk shall be brought to a temperature sufficient to coagulate the albuminous parts of said milk, as a preparatory process to condensation.

What I claim as my invention, and desire to secure by Letters Patent, is—

The admitting or injecting of steam directly into milk to coagulate the albumen, as a preparatory process to condensation.

JOHN G. BORDEN.

Witnesses:
    FRANK WELLS,
    JOHN S. ENO.